United States Patent
Srinivas et al.

(10) Patent No.: US 7,249,161 B2
(45) Date of Patent: Jul. 24, 2007

(54) METHOD AND SYSTEM FOR FACILITATING INSTANT MESSAGING TRANSACTIONS BETWEEN DISPARATE SERVICE PROVIDERS

(75) Inventors: Bindignavile Srinivas, Westford, MA (US); Mitri Abou-Rizk, Newton, MA (US)

(73) Assignee: Nokia Corporation, Espoo (FI)

( * ) Notice: Subject to any disclaimer, the term of this patent is extended or adjusted under 35 U.S.C. 154(b) by 793 days.

(21) Appl. No.: 10/331,040

(22) Filed: Dec. 27, 2002

(65) Prior Publication Data

US 2004/0128352 A1    Jul. 1, 2004

(51) Int. Cl.
G06F 15/13 (2006.01)

(52) U.S. Cl. ............... 709/206; 709/205; 709/246; 370/335

(58) Field of Classification Search ............... 709/205, 709/206, 246; 370/335
See application file for complete search history.

(56) References Cited

U.S. PATENT DOCUMENTS

| | | | | |
|---|---|---|---|---|
| 6,912,564 B1 * | 6/2005 | Appelman et al. | ......... | 709/204 |
| 7,016,978 B2 * | 3/2006 | Malik et al. | ......... | 709/246 |
| 7,058,036 B1 * | 6/2006 | Yu et al. | ......... | 370/335 |
| 2002/0006803 A1 | 1/2002 | Mendiola et al. | ......... | 455/466 |
| 2002/0021307 A1 | 2/2002 | Glenn et al. | ......... | 345/753 |
| 2002/0035605 A1 * | 3/2002 | McDowell et al. | ......... | 709/206 |
| 2002/0055975 A1 * | 5/2002 | Petrovykh | ......... | 709/205 |
| 2002/0065938 A1 | 5/2002 | Jungck et al. | ......... | 709/246 |
| 2003/0131061 A1 * | 7/2003 | Newton et al. | ......... | 709/206 |
| 2004/0019637 A1 * | 1/2004 | Goodman et al. | ......... | 709/204 |
| 2004/0030750 A1 | 2/2004 | Moore et al. | ......... | 709/204 |
| 2004/0037271 A1 | 2/2004 | Liscano et al. | ......... | 370/352 |
| 2004/0068567 A1 | 4/2004 | Moran et al. | ......... | 709/227 |
| 2004/0249891 A1 * | 12/2004 | Khartabil et al. | ......... | 709/206 |

FOREIGN PATENT DOCUMENTS

EP   1 104 964 A1   6/2001
WO   WO 01/86471 A1   11/2001

OTHER PUBLICATIONS

Crocker, D., et al., "Common Presence and Instant Messaging (CPIM) draft-ietf-impp-cpim-03", Aug. 14, 2002, IETF Standard-Working-Draft, Internet Engineering Task Force, 36 pgs.

* cited by examiner

*Primary Examiner*—Jinsong Hu
(74) *Attorney, Agent, or Firm*—Harrington & Smith, PC

(57) ABSTRACT

A method and system is described for facilitating instant messaging (IM) between a first user with an address that includes a first domain name and a second user with an address that includes a second domain name different from the first. A substitute address is chosen that includes the second domain name and is mapped to the first address. An IM sent from the first user to the second is copied and re-addressed to be sent from the substitute address. This maintains consistency of domain names between the addressor and addressee, allowing existing IM systems that inhibit IM between incompatible IMSPs to deliver the message.

15 Claims, 5 Drawing Sheets

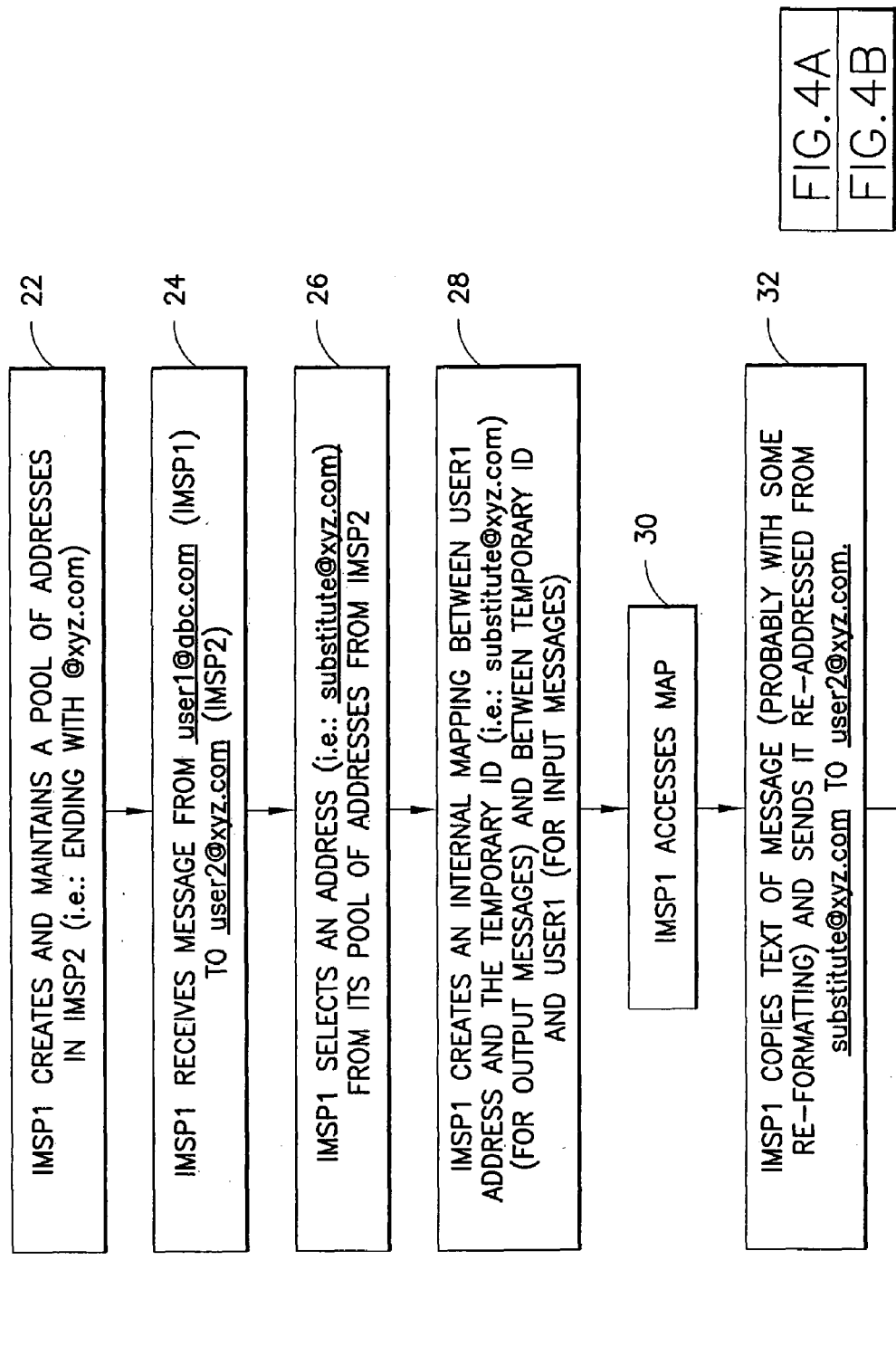

METHOD AND SYSTEM FOR FACILITATING INSTANT MESSAGING TRANSACTIONS BETWEEN DISPARATE SERVICE PROVIDERS

TECHNICAL FIELD

These teachings relate generally to instant messaging on an electronic network, such as the internet or an intranet (e.g., a private network), between two or more user addresses in different domains. It is particularly related to instant messaging among two or more user addresses wherein at least two user addresses include domain names that differ from one another, such as from different instant messaging service providers.

BACKGROUND

Instant messaging (IM) is a method and system of live or nearly live communication, over the internet or other electronic network, between two users who are both simultaneously logged on to an IM service provider (IMSP). The IMSP provides access to the network as well as software to facilitate IM between its users. It should be noted that there are generally two types of software: "Client-software" that is downloaded by the end-user (generally this is distributed freely) and "Server-Software" that is not downloaded by the end-user. The Server-Software is the core and the engine of the IMSP. It is the Server-Software behavior that distinguishes IMSPs from one another by offering different compelling features. Typically, users download IM Client-Software that enables them to engage in IM with other users of the same IMSP who have also downloaded the same or compatible software. There are a variety of IMSPs, for example: Wireless Village (WV), AOL, Yahoo!, MSN and ICQ (AOL is a registered trademark of America Online, Inc.; Yahoo! is a registered trademark of Yahoo! Inc.; MSN is a registered trademark of the Microsoft Corporation; and ICQ is a registered trademark of ICQ, Inc.). IM software from one IMSP generally does not enable IM communications with users of another IMSP, since most IMSPs use a proprietary solution.

Typical IM software today includes a first user (for example, user1) downloading the IM Client-Software onto his own computer. The IM software downloaded onto a user's computer is generally referred to as the Client-Software (or more simply as the client), a convention that is continued herein. The client connects to an IMSP server when user1 logs on. The client is pre-configured to know the IP address of the server, so when a user logs in (by entering the username and password) using the pre-downloaded proprietary client, it (the client) requests to connect and authenticate the user to the server. Once the user is authenticated, the server updates the client with a list of buddies and their presence information. The server sends a message back to the user1 client as to which buddies from the user1 generated buddy list are logged on, along with their presence information (such as mood, availability, etc.). The client changes the displayed status on user1's computer to indicate which buddies are logged on. The user1 access, information is also sent by the server to the clients of those logged-on buddies. When user1 wishes to send an IM message to a buddy who is logged on, say user2, user1 clicks or selects the name (IM address) for user2, types or attaches a message in the computer window provided, and sends the message. Because the user1 client has already been provided the presence information for the user2 client, the message from user1 is sent directly to user2.

It can be noted at this point that in IM the sending of the message is not guaranteed, so that if an IM is sent from a source to a destination there is no guarantee that it will reach the destination (although this is rare). Note as well that it may be possible to send a message to an end-user that has not logged into the IMSP server, although the behavior of this feature is server dependent (e.g., Yahoo will save a user's messages until the next time the user logs in, while some other IMSPs may not). Also, note that the message from user1 is not sent directly to user2, it is routed instead through the IMSP Server software.

That is, current IM architecture passes all IM messages through a server, which routes the message. A reply from user2 is transmitted to user1 in like manner. An IM session remains open until one of the users logs off, such as by logging off of his client. That client then signals the IMSP server of the offline status, and the server then notifies the clients of all of the online buddies of that revised status. Note that logging off of a client may be distinguished from closing a client, which may be instead only a change in presence information (e.g., active to idle).

One major limitation has been that users of one IMSP identified by one domain name could not effect IM with users of another IMSP identified by a different domain name. This is because each IMSP has its own proprietary standards on how they pack and unpack messages, standards that are not necessarily enabling of the proprietary standards of others. Some users have overcome this limitation by maintaining accounts in each IMSP in which one of their potential buddies has an account. However, this leads to users having to maintain multiple accounts with multiple login identifiers and passwords, having to maintain open clients for each IMSP a user chooses to monitor during any given session on his computer, and the inability to have an IM 'conversation' with two buddies who each use a different IMSP. For example, user1@yahoo.com could engage in IM with user2@yahoo.com, but not with user2@msn.com.

Certain IMSPs advertise an ability to facilitate IM communications between users of only specified domains that differ. For example, Odigo (Odigo is a registered trademark of Odigo, Inc.) asserts on its website (www.Odigo.org) that IM users can access two distinct IMSP's: AIM and ICQ. The specific protocol for facilitating this appears to be proprietary. However, since IM is only enabled between specified domains, it is assumed the service is facilitated by servers associated with each domain acting in concert under a contractual relation between the IMSPs.

For convention with regard to this disclosure, an IM address "username@domainname" is parsed as follows. The characters to the left of the '@' symbol are referred to as the username. The characters to the right of the '@' symbol constitute the domain name or domain, which in this convention includes the top-level domain name for simplicity. IM addresses and parts thereof will be offset herein by underlining for clarity.

SUMMARY OF THE INVENTION

The foregoing and other problems are overcome, and other advantages are realized, in accordance with the presently preferred embodiments of these teachings.

A method of facilitating instant messaging (IM) between two domains over an electronic communication network is shown. The first address includes a first domain and the second address includes a second domain that differs from the first. The steps of the method include first receiving a first message from the first address that is directed to the second address. The next step is mapping the first address to a substitute address, wherein the substitute address includes the second domain. Next, the first message is sent from the substitute address to the second address.

Various further and additional steps are disclosed to facilitate IM communications from the second address back to the first address, each of which is discussed in detail below.

The present invention also comprises a system for facilitating instant messaging over an electronic network between a first address that includes a first domain and a second address that includes a second domain that differs from the first domain. The first domain is associated with a first instant messaging service provider, and the second domain is associated with a second instant messaging service provider. The system comprises a substitute address and a map that correlates the substitute address to either the first address or the second address. Preferably, the substitute address includes the second domain, and the map correlates the substitute address to the first address.

This invention provides a method and a system for facilitating instant messaging (IM) between a first user with an address that includes a first domain name and a second user with an address that includes a second domain name different from the first. A substitute address is chosen that includes the second domain name, and the substitute address is mapped to the first address. An IM sent from the first user to the second is copied and re-addressed to be sent from the substitute address. This maintains consistency of domain names between the addressor and addressee, allowing existing IM systems that inhibit IM between incompatible IMSPs to deliver the message.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
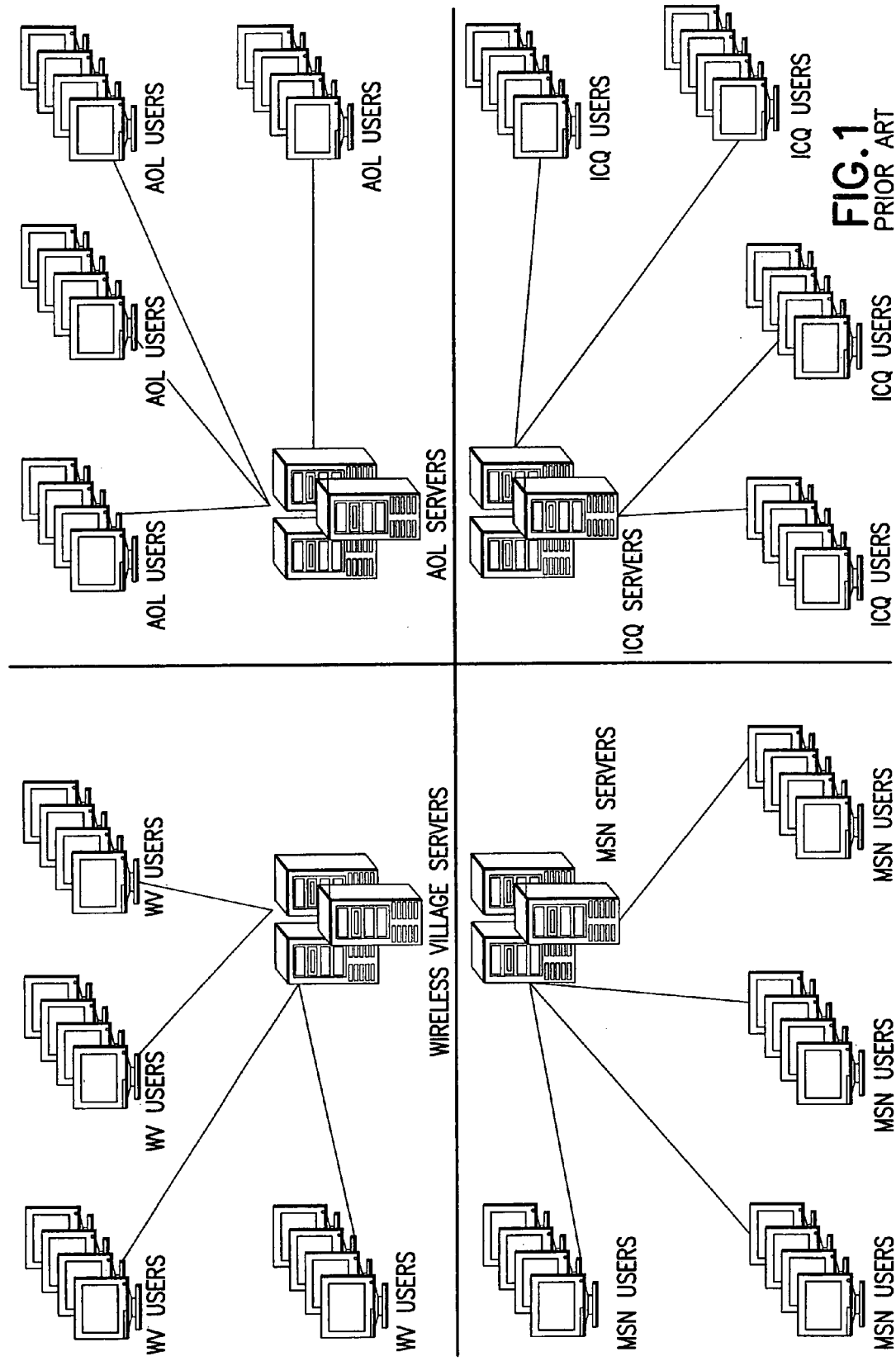
FIG. 1 is a conceptual overview of IM Systems of the prior art, wherein each IMSP (Wireless Village, AOL, etc.) is isolated from the other IMSPs.

The present invention is best understood with reference to the associated drawings, wherein FIG. 1 is a simplified block diagram exposing a limitation of instant messaging (IM) systems of the prior art. FIG. 1 depicts four widely used instant messaging service providers (IMSPs): Wireless Village (WV), America Online (AOL), Microsoft Network (MSN) and ICQ. Each of these IMSPs facilitates IM between their own customers or users, but do not enable those same users to engage in IM with users of other IMSPs. In effect, each IMSP provides IM only among its own island of users.

Figure 2:
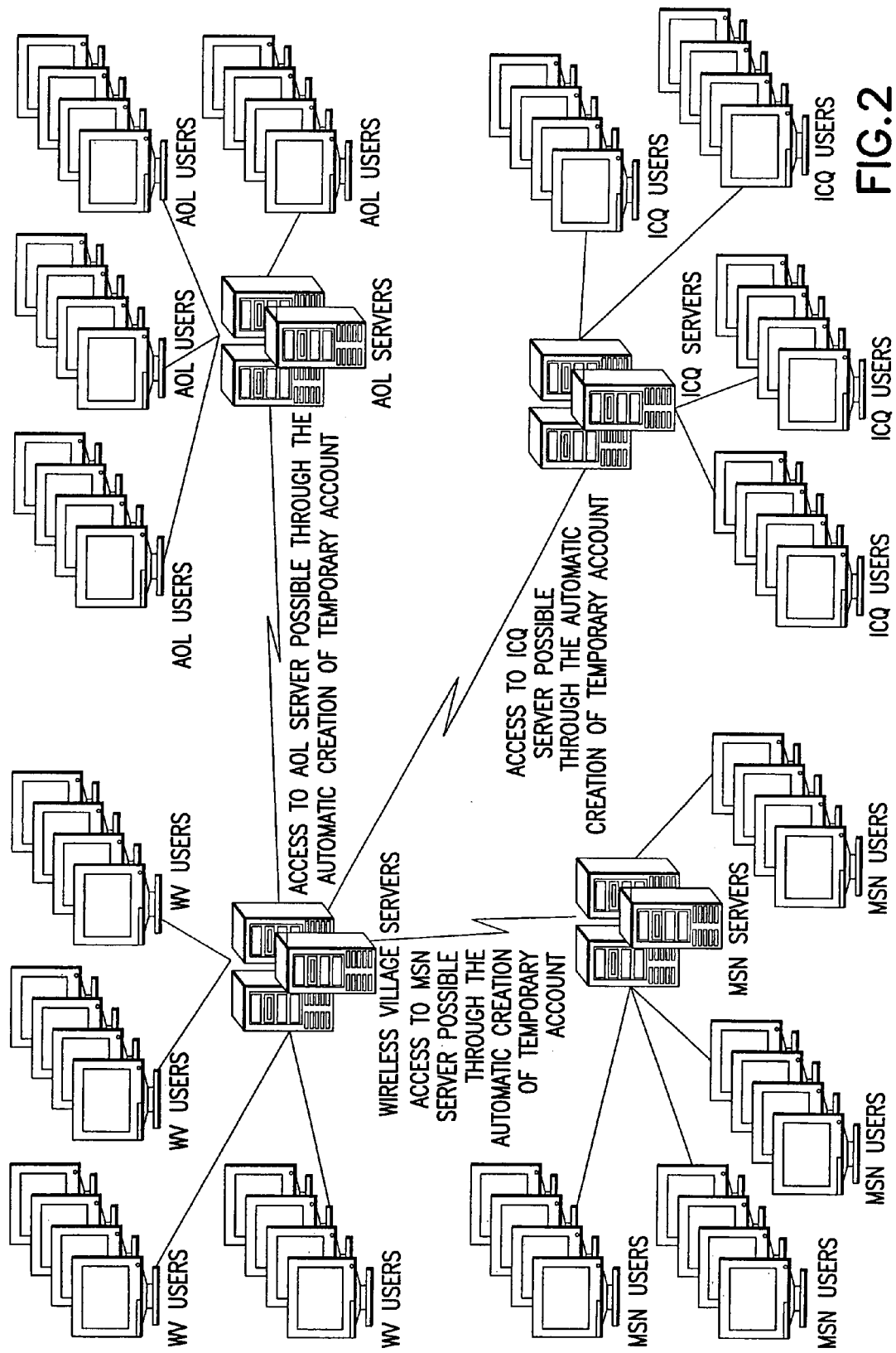
FIG. 2 is a conceptual overview of an IM System according to the present invention, wherein an IMSP that does not preclude IM between users in different domains can facilitate IM through other IMSPs.

FIG. 2 depicts a simplified block diagram wherein the limitation of FIG. 1 is overcome for users of Wireless Village. Employing the preferred embodiment of the present invention, WV enables its users to engage in IM with users of any other IMSP, of which only three are depicted. FIG. 2 is illustrative, as the present invention is not necessarily limited to direct contact between the servers of disparate IMSPs for every phase of IM communication. Throughout this disclosure and the ensuing claims, both servers and clients associated with a particular IMSP are considered to comprise that particular IMSP. For example, WV includes the WV servers as well as every WV client resident in the computers of WV users.

Figure 3:
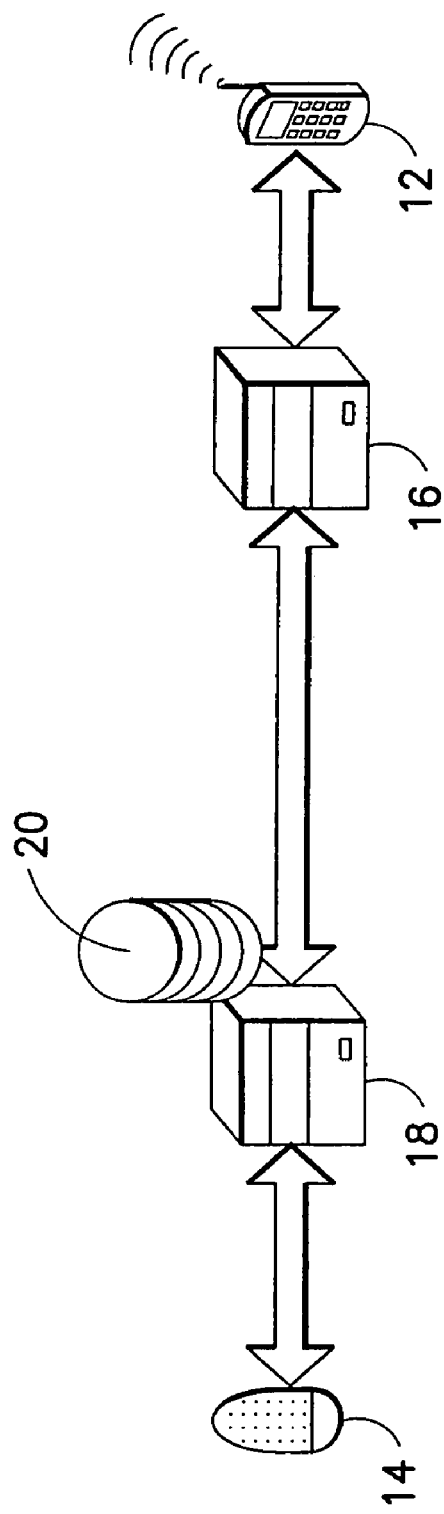
FIG. 3 is a block diagram of a first user on a first IMSP engaging in IM with a second user on a second IMSP.

FIG. 3 illustrates in block diagram how IM communications between two users of disparate IMSPs is facilitated. A sender 12 (depicted as a mobile terminal) enters a message directed to a recipient 14 (depicted as another mobile terminal). The sender and/or recipient may alternatively use a computer terminal or any other device on which an IMSP client is resident. By way of example, the sender will be designated as Mitri using the IM address mitri@wv.com and the recipient will be designated as Srini using the IM address srini@icq.com. By their IM domains, Mitri's IMSP 16 is Wireless Village and Srini's IMSP 18 is ICQ. In accordance with an aspect of this invention, Mitri's IMSP 16 creates a pool of IM addresses. Note that in this case that the IMSP is WV, which does not maintain the account, as the accounts are maintained by ICQ. That is, the accounts are maintained by ICQ, and stored at the ICQ server, and the WV server behaves (in this case) like any ICQ user.

The pool of IM addresses need not be fixed, and may change over time. Preferably, creation of the pool is done prior to the time that Mitri directs a message to Srini, so that an IMSP practicing the present invention maintains pools of IM addresses within several domains, each domain consistent with one of numerous other IMSPs. Alternatively, Mitri's IMSP may create an address consistent with the IM system of Srini's IMSP when Mitri attempts to initiate IM with a user of a foreign IMSP such as Srini.

When Mitri's IMSP detects a message that is directed to a foreign IMSP, for example, "From mitri@wv.com; To srini@icq.com", Mitri's IMSP accesses the pool of addresses within the domain of Srini's IMSP (or creates a new address within that domain) and reserves one of them for the pending IM session initiated by Mitri. By example, the address from the pool reserved for this IM session will be designated substitute@icq.com. Mitri's IMSP further maps Mitri's address, mitri@wv.com, to the address reserved from the pool and stores this mapping data. Because the recipient IMSP will only transfer IM messages when both sender and receiver addresses are from within its own domain, Mitri's IMSP copies the message from Mitri to Srini into an account bearing a domain that will be processed by Srini's IMSP. Note that whether the IM (from Mitri to Srini) is copied to the IM (from substitute to Srini) is an implementation detail. The IM could be copied, or the From address can be changed without explicitly copying the message. However, from Mitri>Srini the message needs to be copied due to the packaging and unpackaging of the entire IM message.

Specifically, Mitri's IMSP accesses the mapped data and finds mitri@wv.com is mapped to substitute@icq.com. Mitri's IMSP copies the text of the message into an IM message from the reserved address. The copied message is now addressed "From substitute@icq.com; To srini@icq.com". The copied message with an address within the recipient's domain is sent over the internet, world wide web, or other electronic network. The recipient's IMSP recognizes this network traffic as IM between two of its own users, and directs the message to srini@icq.com as Mitri intended.

It is important to note that sending Mitri's copied message from the address substitute@icq.com makes the message indiscernible, from the perspective of the recipient's IMSP, from IM traffic among any of the regular users of the recipient's IMSP. The message is indiscernable because the packaging of the message is performed by the same Client-Software as the recipient IMSP.

The actual graphical screen interface viewed by Srini may or may not indicate that Mitri is the sender. Preferably it does indicate the sender to better facilitate communication between the end users, Mitri and Srini in this example. It should be noted, however, that copying of the message may allow the server to add/append a string (e.g., username/buddyname) to indicate where the message is coming from. These are features that the originating IMSP can provide. To maintain privacy of the true sender Mitri from all except Srini, the mapping of substitute@icq.com with mitri@wv.com is preferably deleted and the substitute address is returned to the pool or deleted (i.e., no longer associated with mitri@wv.com or srini@icq.com) once the IM session between Mitri and Srini is completed. Completion is typically signaled by at least one of the end users logging off of their respective client.

There are pluralities of methods by which return communications from Srini to Mitri maybe accomplished. In the example below, user1 is the sender of the original message who initiates IM between the parties using IMSP1. IMSP1 is identified with the domain "abc.com", and does not inhibit transfers between domains. User2 is the intended recipient of the original message and uses IMSP2. IMSP2 is identified with the domain "xyz.com". The domains "abc.com" and "xyz.com" represent disparate domains similar to wv.com and icq.com in the above example using Mitri and Srini.

Figure 4B:
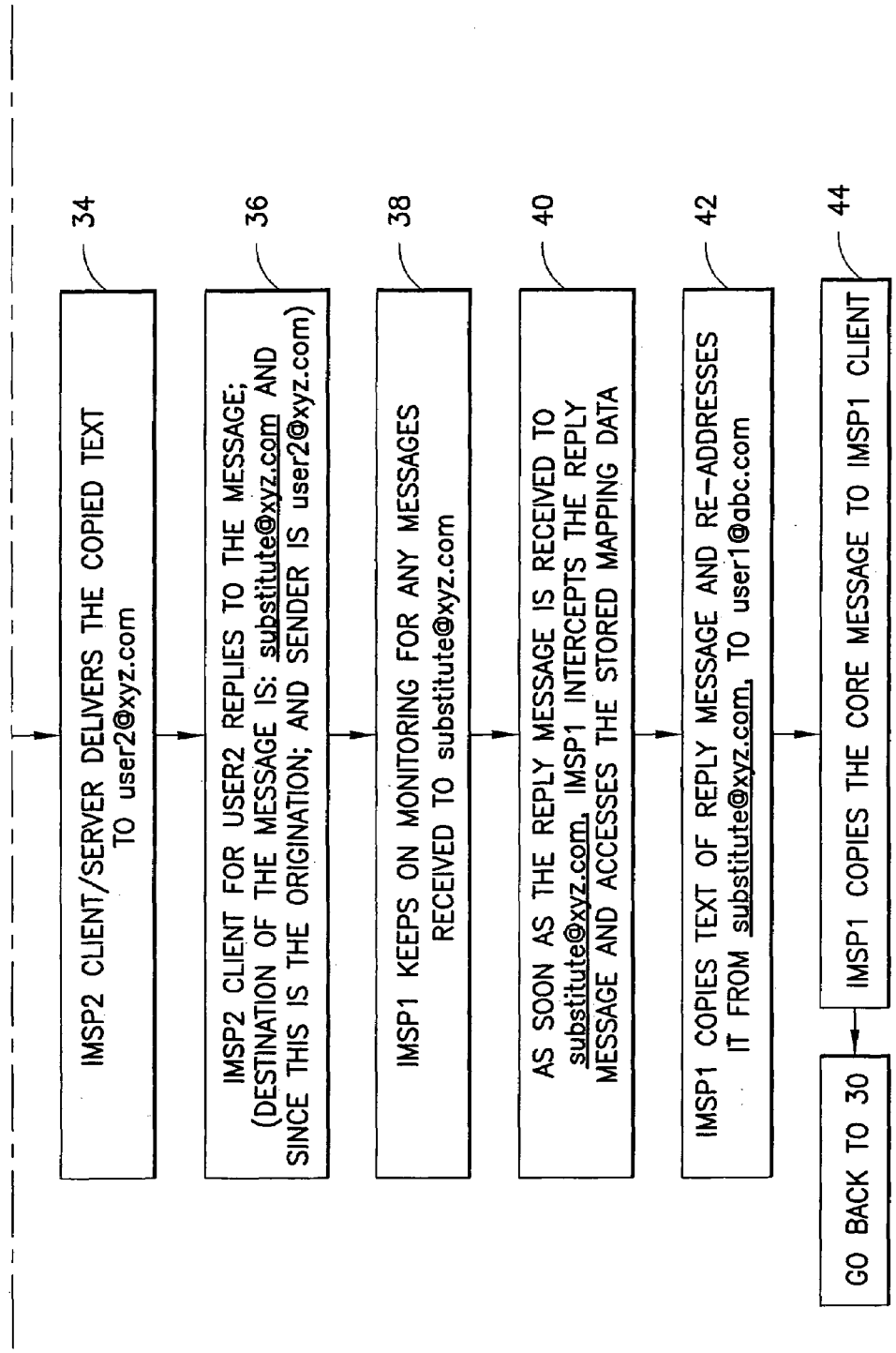
FIG. 4 is a flow chart outlining the steps for two-way instant messaging in accordance with an embodiment of the invention.

FIG. 4 illustrates in block diagram the architecture that enables the present invention. As described above, IMSP1 creates and maintains at block 22 a pool of addresses within then domain that is recognizable by IMSP2. For example, if IMSP2 facilitates IM between users with domain names (@xyz.com, then IMSP1 will create a pool of identifiers that also end with (@xyz.com. IMSP1 receives an original message that is directed, for example, "From user1@abc.com; To user2@xyz.com" at block 24. Recognizing that xyz.com is a foreign domain, IMSP1 selects and reserves in block 26 an address from a pool of addresses in the xyz.com domain that was created at block 22. IMSP1 then maps and stores the reserved address with the addresses of the initial message at block 28 as follows: user1@abc.com is mapped to substitute@xyz.com; and substitute@xyz.com is mapped to user2@xyz.com. This mapped data may be bidirectional: i.e.: user1@abc.com is mapped to substitute@xyz.com; and substitute@xyz.com is mapped to user1@abc.com. Once the mapping data is stored, it is accessed by IMSP1 at block 30. IMSP1 then copies the text of the original message sent in block 24 and sends the copied message which is now addressed as "From substitute@xyz.com; To user2@xyz.com" over the network at block 32. IMSP1 may have to re-format the original message in order to copy its text. Because the copied message is sent from a domain identified with IMSP2, it is sent by IMSP1 but through IMSP2 onto the network. IMSP2 receives this message at block 34 and directs it to user2@xyz.com as it would any other IM traffic between two of its users.

Following receipt of the message, user2 sends an original reply that is addressed "From user2@xyz.com; To substitute@xyz.com". This message is received by IMSP2 at block 36, and at block 38 IMSP2 directs this reply to substitute@xyz.com as it would for any other user of its services. Continually from the time of the mapping done in block 38, IMSP1 monitors network traffic addressed to or from substitute@xyz.com, and discerns at block 40 that an original reply is directed to that address. IMSP1 intercepts that message and accesses the stored mapping data. IMSP1 uses the mapping data to substitute the address of the reply recipient at block 42. IMSP1 then copies the text of the original reply into a message addressed: "From user2@xyz.com; To user1@abc.com, and sends the copied reply to user1@abc.com at block 44. It is to be noted that this copied reply does not maintain consistent domain names between addressor and addressee. As stated above, an IMSP practicing the present invention must not inhibit delivery of an IM message with disparate domains. It is believed that most popular IMSPs do so inhibit IM between disparate domains, primarily for business rather than technical reasons.

IMSP1 may then receive, at block 46, an additional message "From user1@abc.com To user2@xyz.com". IMSP1 then accesses the map again as in block 30 and continues as before to copy message text and substitute addresses to enable IM between user1 and user2 so long as they are both logged on. Once communication between user1 and user2 is terminated, the reserved address substitute@xyz.com is returned to the pool of addresses for future use, or is deleted (depending on the implementation), not necessarily related to either user1@abc.com or user2@xyz.com. This minimizes the required size of the address pool.

It is noted that the domain names per se are not what allows the IMSP1 to deliver or to restrict the sending of the messages between two different IM providers; instead it is the proprietary information and the packaging and unpackaging of the IM message that typically differs between each IM provider that does not allow the communication between two different IMSPs. That is, it is not the domain names, but the incompatibilities between IMSPs, that affects the ability to send and receive IMs.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive.

What is claimed is:

1. A method of facilitating instant messaging over an electronic communication network, comprising:
   receiving a first message, from a first address that includes a first domain identified with a first instant messaging service provider, directed to a second address that includes a second domain different than the first domain, the second domain identified with a second instant messaging service provider;
   mapping the first address to a substitute address that includes the second domain;
   copying a text of the first message; and
   sending the copied text of the first message from the substitute address to the second address.

2. The method of claim 1, where the substitute address is selected from a pool of addresses that each include the second domain.

3. The method of claim 2, where the mapping between the first address and the substitute address is deleted after instant messaging between the first address and the second address is terminated.

4. The method of claim 2, where the substitute address is one of returned to the pool or deleted after instant messaging between the first address and the second address is terminated.

5. The method of claim 1, executed by the first instant messaging service provider.

6. The method of claim 1, wherein copying a text of the first message further comprises re-formatting the copied text of the first message.

7. The method of claim 1, wherein sending the copied text of the first message comprises appending the copied text to another message that is sent from the substitute address.

8. The method of claim 1, further comprising:
monitoring the substitute address for a reply message;
mapping the substitute address to the first address;
copying a text of the reply message; and
sending the copied text of the reply message to the first address.

9. The method of claim 8, further comprising one of deleting the substitute address or returning the substitute address to a pool of addresses that each include the second domain.

10. The method of claim 8, where the reply message is directed from the substitute address to the first address by means of the mapping.

11. A program of machine-readable instructions, tangibly embodied on an information bearing medium and executable by a digital data processor, to perform actions directed toward facilitating instant messaging, the actions comprising:
storing a plurality of instant messaging addresses associated with a first domain;
creating a pool of substitute instant messaging addresses associated with a second domain;
responsive to receiving a message from a first address of the plurality that is directed to a second address associated with the second domain, mapping the first address to one of the substitute instant messaging addresses; and
sending a text of the message from the one substitute instant messaging address to the second address.

12. The program of claim 11, the actions further comprising:
following sending a text of the message, and responsive to receiving a reply message directed from the second address to the one substitute instant messaging address, sending a text of the reply message to the first address.

13. A system for facilitating instant messaging over an electronic network between a sender address associated with a first domain and a recipient address associated with a different second domain, the system comprising:
means for storing a pool of substitute instant messaging addresses associated with a second domain;
means for mapping one substitute instant messaging address to a sender instant messaging address associated with a first domain;
means for receiving a message directed from the sender instant messaging address to a recipient instant messaging address associated with the second domain;
responsive to receiving the message, means for sending a text of the message from the one substitute instant messaging address to the recipient instant messaging address.

14. The system of claim 13, wherein the means for storing, for mapping, for receiving and for sending comprises at least one server.

15. The system of claim 13, wherein the means for receiving is further for receiving a reply message directed from the recipient instant messaging address to the one substitute instant messaging address, wherein
responsive to receiving the reply message, the means for sending is for sending a text of the reply message to the sender instant messaging address.

* * * * *